Figure 1:
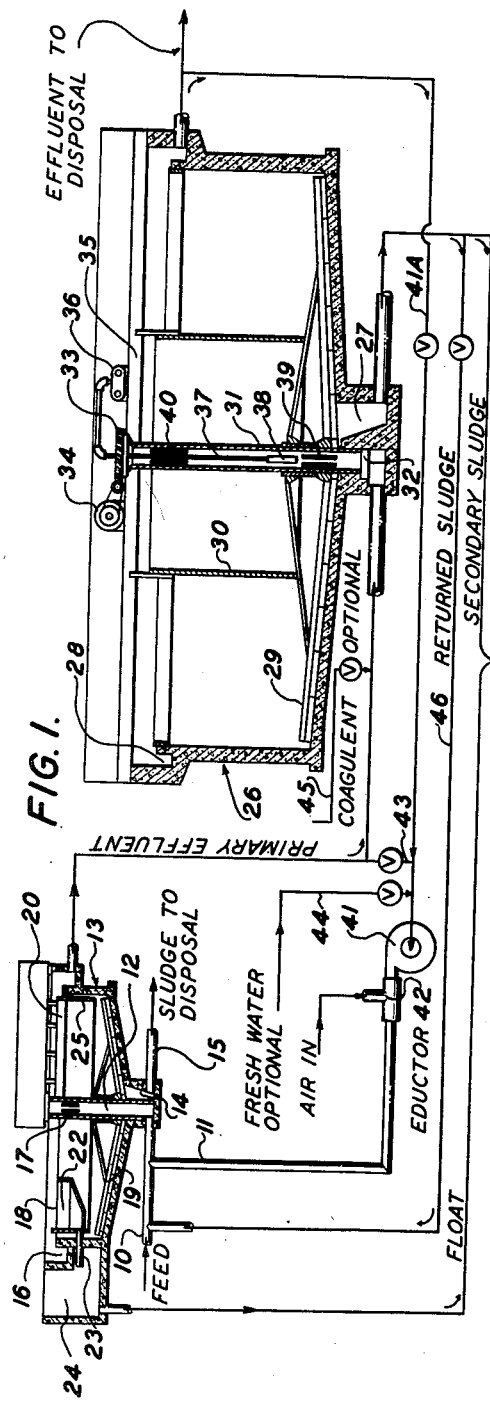

May 25, 1954  A. M. KIVARI ET AL  2,679,477
SEWAGE TREATMENT
Filed Sept. 15, 1949

INVENTORS.
ARTHUR M. KIVARI
EARL M. KELLY

ATTORNEY

Patented May 25, 1954

2,679,477

UNITED STATES PATENT OFFICE 2,679,477

SEWAGE TREATMENT

Arthur M. Kivari, Los Angeles, and Earl M. Kelly, Millbrae, Calif., assignors to Process Engineers Incorporated, San Francisco, Calif., a corporation of California Application September 15, 1949, Serial No. 115,853

8 Claims. (Cl. 210—3)

This invention is concerned with treatment of sewage, i. e., water containing domestic, industrial or farm wastes having dissolved or suspended organic components. It provides improvements in methods and apparatus for clarification and purification of sewage, to the end that throughput is increased without sacrifice in the quality of the operation and in many instances with an actual increase in the degree of removal of both dissolved and suspended constituents.

In accordance with the invention, the incoming stream of sewage is mixed, while confined, with a relatively small stream of charged water. The latter is obtained by subjecting a stream of water to pressure, say by means of a pump, and then suddenly releasing it in the form of a jet (preferably a turbulent jet) in the presence of the gas (say air or carbon dioxide) with which the water is to be charged. The gas is entrapped, dispersed, and at least partly dissolved in the water, thus "charging" it. The charged stream in confined condition is then introduced into the confined stream of sewage, so that the two blend. The resultant mixture is then discharged into a pool of liquid having an unconfined upper surface i. e., a free surface at substantially atmospheric pressure. The finely divided gas in the mixture escapes in the pool as fine bubbles to which floatable solids and semi-solids are attached, and rise upward to form a froth or scum on the pool surface. This froth or float is skimmed off the pool. At the same time heavier solids settle to the bottom of the pool to be removed as sludge, and the skimmed clarified liquid effluent is permitted to flow out from an upper level in the pool.

It is desirable to entrap the gas in the water stream by forcing the water through an eductor or the like having a side leg through which the gas is sucked into the stream. The well known Schutte-Koerting type of eductor which produces a turbulent jet is preferred, because the turbulence aids in obtaining dispersal and solution of the gas in the water.

Almost any available gas may be employed to charge the water stream. Air serves well and has the advantage of being available always. Carbon dioxide is desirable because of its high solubility in water. Thus flue gases or any others having a high carbon dioxide content may be employed.

Preferably the confined mixture of charged water and sewage is held in this state for a short period to condition it, i. e., to assure that the gas contained in the mixture is thoroughly distributed therein and also to give an opportunity for floatable material to contact the gas. The desired conditioning time may be gained by requiring the mixture to pass upward through a conduit of substantial volume prior to discharge into the pool. Thus the conduit or column may be disposed within the pool itself with its discharge near and preferably just below the normal surface thereof. A column several feet in height, say 10, is recommended.

We have found that gas admitted into a sewage stream as described above, is particularly effective in floating solids and semisolids out of the sewage. Moreover, the operation is cheap and simple. A gas-charged stream which is only a small fraction of the sewage stream itself, say 10% or less, serves to float a large proportion of material out of the sewage. The cost of raising the pressure of this small water stream in order that it may entrap the gas is low (in terms of equipment, power consumption, maintenance, etc.) as compared with the cost of raising the pressure on the whole sewage stream to permit it to entrap the gas directly. And, since the water which is charged is ordinarily substantially free of solids etc., the opportunities for clogging pumps, eductors, etc., employed in the charging operation, are minimized.

The water which is charged may be fresh water, but preferably is clarified effluent from some stage in the sewage treatment operation. The use of clarified effluent improves the efficiency of the sewage treatment process by reducing dilution. Moreover, such effluent is substantially saturated with gas, so that less gas is required to "recharge" it.

Figure 2:
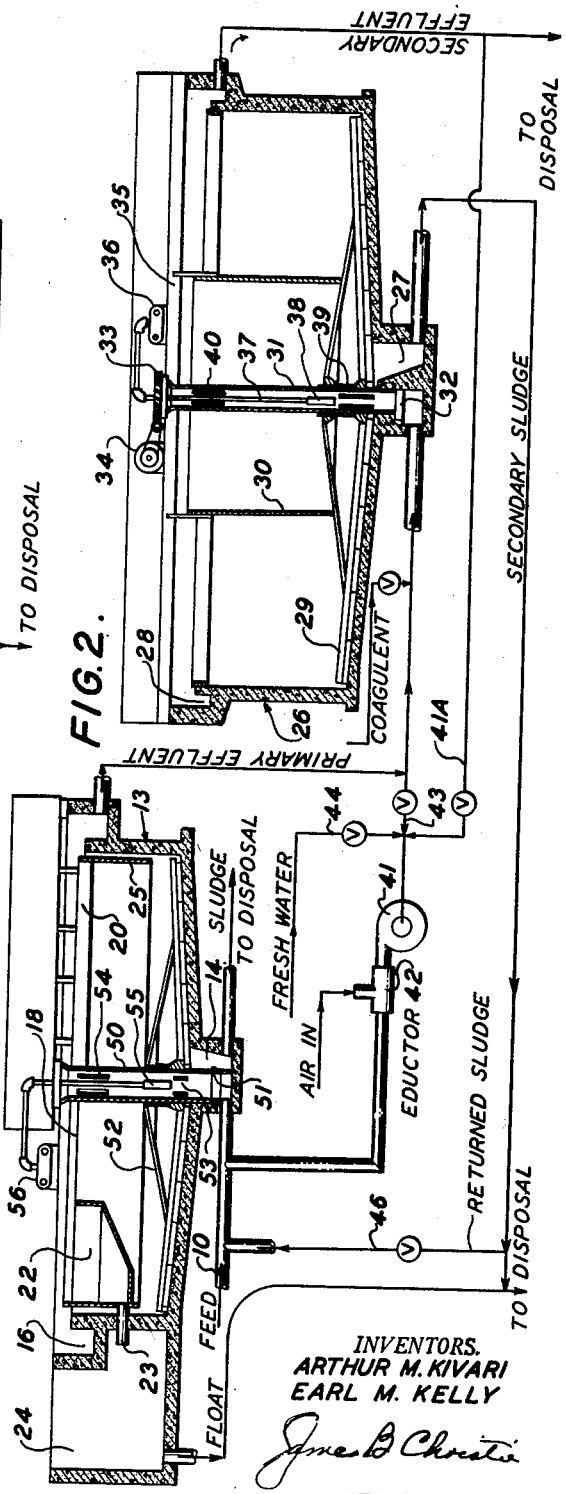

The invention has the marked advantage that existing sewage treatment plants are easily adapted to its practice. For example, a conventional clarifier provided with raking mechanisms to move settled sludge to an underflow well, may serve to contain the pool in which the flotation occurs. For optimum results however, the invention should be practiced in equipment such as is set forth in the following detailed description and illustrated in the accompanying drawings in which:

Fig. 1 is a flow sheet illustrating schematically one presently preferred embodiment of the invention, and Fig. 2 is another flow sheet showing schematically another embodiment of the invention.

In Fig. 1, a stream of raw sewage flowing in a pipe 10 is mixed with a side stream of charged water admitted through a pipe 11. The resulting mixture of charged water and sewage is forced into the bottom of a central well 12 of a primary clarifier 13 in which both flotation and settlement occur. The clarifier is a relatively wide cylindrical tank having a gently sloping inverted conical bottom which terminates in a sludge pit 14 from which settled sludge flows through a pipe 15 to disposal. The clarifier has a conventional peripheral launder 16 around its upper edge into which clarified effluent flows. The central well rises upward in the clarifier and is provided with a number of vertical slots or discharge ports 17 which communicate with the pool (retained in the tank) just below the pool level 18. A conventional rake mechanism 19 is provided in the bottom of the tank and extends from the outside wall of the tank to the central well. The rake mechanism rotates slowly about the vertical axis of the tank and the central well and the rakes move settled sludge in spiral paths toward and into the sludge pit. If desired, the rake mechanism may be attached rigidly to the central well structure, which is itself rotated in order to rotate the rake arms. A horizontal skim plate 20 is dosposed to skim the surface of the pool. It too is rotated slowly on the vertical axis of the tank and moves scum from the surface of the pool into a scum box 22 disposed inside the tank near the outer periphery. Material skimmed into the scum box flows through a side pipe 23 out of the tank into a sump 24 from which it is drained and sent to disposal. A coaxial round vertical baffle plate 25 is disposed inside but slightly spaced from the tank wall and rises from a level inside the pool to a level above the pool surface. This prevents scum from overflowing with the clarified effluent, which rises in the annular gap between the baffle and the wall.

The effluent from the primary treatment unit flows into the central well of a secondary treatment unit. This unit, like the first, is a cylindrical tank 26 with an inverted conical bottom sloping from the tank wall to a sludge pit 27. It has an upper peripheral launder 28 into which effluent flows over the tank wall, and a conventional rake mechanism 29 which, as it rotates, moves settled sludge off the entire bottom to the sludge pit. Unlike the primary unit however, the upright concentric annular baffle 30 of the secondary unit is disposed about midway between the central well and the tank wall and extends from a level just above the arms of the rake mechanism to a level above that of the pool in the tank. The rake arms are fastened rigidly to the central well or shaft 31 which rests on a sealed annular bearing 32 below the tank bottom. The shaft has a ring gear 33 around it at the top and is driven through gearing by a motor 34 resting on beams 35 overlying the pool. A blower 36 supplies low pressure air to a pipe 37 that extends down into the shaft and terminates in a porous diffuser 38. The shaft has vertical inlet ports or slots 39 in it adjacent the tank bottom and below the diffuser. It has vertical outlet ports or slots 40 which communicate with the pool in the tank adjacent its surface.

Clarified effluent from the secondary unit is sent, in the main to disposal. A small fraction of this effluent, say 10% to 5% or even less, flows to a centrifugal pump 41 through a valved line 41A which raises its pressure and forces it through an eductor 42, which may be of the Venturi tube or any other conventional type. The eductor has a side inlet pipe into which air is sucked as a result of the jet action developed in the eductor. It is the latter which supplies the gas-charged water for admixture with the incoming sewage, as described at the outset.

If desired, the water to the pump may be clarified effluent from the first clarifier unit, as indicated by the valved flow line 43. It may also be fresh water introduced to the pump through a valved side pipe 44.

In some instances it may be desirable to add a coagulant 45, such as alum, to the effluent of the primary unit just prior to its introduction into the secondary unit.

The sludge from the pit of the secondary unit may be sent to disposal, or part or all of it may be returned, as shown, through a valved line 46 to the sewage stream ahead of the primary unit, and preferably ahead of the point at which the charged water is introduced.

The operation of the apparatus of Fig. 1 is as follows:

The raw sewage to be treated is pumped or fed by gravity through the pipe which enters the bottom of the feed well in the primary clarifier. A stream of returned sludge from the secondary clarifier enters the raw feed stream ahead of this point and the charged water stream enters the influent stream between the point of entry of the returned sludge and the base of the central well in the primary clarifier. The gas contained in the charged stream mixes with the influent and the returned sludge and the resultant gasified mixture is conditioned as it rises through the feed well. The gasified stream is discharged from the feed well into the pool in the primary clarifier with resultant release of fine gas bubbles having floatable solids and semi-solids adhering thereto. The result is the formation of a copious scum which is skimmed off the top of the pool in the primary clarifier. This product is sent to disposal.

Sludge settles in the bottom of the primary clarifier and is raked into the sludge pit from whence it flows to disposal. Clarified water passes up under the annular baffle in the primary clarifier, overflows the wall into the peripheral launder and from this point the bulk of this flow and usually all of it goes to the secondary clarifier. If desired, a coagulant for the solids in the sewage is added to the effluent from the primary clarifier just ahead of the point where this effluent enters the shaft of the secondary clarifier. This shaft, because of the presence of the air diffuser between the bottom slots and the top slots, acts as an air lift and at the same time supplies air to meet the biological oxygen demand of the sewage. Aerated liquid flowing up the shaft discharges into the inner pool of the secondary clarifier. Sludge settles out in the inner pool of the secondary clarifier and also in the outer annular pool. This sludge is raked to the pit of the secondary clarifier and from this point is discharged for disposal or for complete or partial return to the raw feed to the primary clarifier.

Some of the settled sludge is drawn into the bottom of the shaft through the lower ports and is recirculated through the inner pool of the secondary clarifier.

Liquid in the secondary clarifier passes underneath the intermediate annular baffle and rises upward to overflow the wall of the clarifier into the peripheral launder. The bulk of this clarified water passes out of the system. A small percentage, say 5%, may be returned to mix with the primary feed after charging with gas. This charging is accomplished by raising the pressure of this effluent with the centrifugal pump and thence passing it through the eductor where air or other suitable gas, say carbon dioxide or flue gas, is sucked in and partially dissolved.

If desired, part or all of the water to be charged can be the effluent of the primary clarifier which, as shown, may bypass the secondary clarifier and go direct to the pump.

Provision is made for introducing fresh water into the pump inlet if for any reason the supply of effluent from the clarifier operations is interrupted.

The primary clarifier, which also operates as a flotation machine, is highly effective in removal of solids, etc., from the sewage and consequently it can be very small compared with the secondary clarifier. Thus it need only be about one-fifth as large in plan as is the secondary clarifier.

If desired, the air lift and recirculation feature of the secondary clarifier may be omitted, although these features are generally desirable, because of the effect of the air admitted through the diffuser which satisfies the biological oxygen demand of the material undergoing treatment.

If desired, a diffuser may be placed in the central well of the primary clarifier of Fig. 1 and moreover, recirculation of sludge through this well may be had by cutting lower ports in the wall of the well at about rake level.

Fig. 2 illustrates an arrangement in which the primary clarifier is equipped with a central feed well into which diffused air is admitted. Referring to Fig. 2, the system comprises a primary clarifier followed by a secondary clarifier. The secondary clarifier is identical in construction with the secondary clarifier in Fig. 1 and like parts are identified by the same reference characters. The primary clarifier however, although of about the same size as the secondary clarifier, has some of the features of the primary clarifier in Fig. 1.

The primary clarifier 13 of Fig. 2 comprises a cylindrical tank having an inverted conical bottom. A central shaft or feed well 50 extends up through the center of the tank to above the liquid level therein and is rotated by conventional means, not shown. The central shaft rests on an annular bearing 51 below the tank and the arms of a conventional rake mechanism 52 are attached to it. It has a sludge pit 14 near the central shaft into which the rakes move settled sludge.

The central shaft has lower ports 53 at approximately the level of the rakes and upper ports 54 at about the level of the top of the pool in the tank. A hollow porous member 55 which acts as a diffuser is disposed in the central shaft between the top and bottom ports and air under pressure is supplied to it by a centrally disposed air line from a blower 56.

The primary clarifier of Fig. 2 has a skimming arm 20 like that of the primary clarifier of Fig. 1. This moves scum over into a scum tank 22, from whence it flows into an adjacent sump 24 and from this point is sent to disposal. The annular baffle 25 in the primary clarifier of Fig. 2 is like that of the primary clarifier of Fig. 1 and is placed close to the outer wall.

The pump 41 and gas eductor 42 of the apparatus of Fig. 2 are the same as that of Fig. 1 and are arranged in the same fashion.

The apparatus of Fig. 2 operates exactly like that of Fig. 1 except that there is additional aeration in the primary clarifier with circulation of settled sludge through the central column. This aids in flotation and also serves to satisfy the biological oxygen demand in the sewage subjected to the process.

The primary clarifier in Fig. 2 is of substantially the same size as the secondary clarifier so as to give adequate space in which the air added through the diffuser in the primary clarifier can act upon the recirculating material to satisfy the biological oxygen demand.

If desired, the primary and secondary clarifiers shown in Figs. 1 and 2 may be replaced by conventional clarifiers in which no aeration or circulation occurs. In such case, the recirculating ports, the intermediate baffle and the air diffuser in the clarifiers are eliminated. This elimination somewhat reduces the amount of solids removed from the sewage, and also reduces the ability of the equipment to satisfy the biological oxygen demand of the sewage. However, in some cases, this demand may not be high and may be satisfied by air introduced into the primary clarifier in the form of charged water.

The primary clarifier in the apparatus of Fig. 1, and in fact all the clarifiers shown may be provided with air diffusers disposed outside the central column, and preferably near it. Thus the diffuser arrangement disclosed in co-pending application Serial No. 96,184, filed May 31, 1949, by Kelly and Kivari now Patent No. 2,568,452 may be employed to provide aeration in excess of that accomplished by the charged water.

Sewage treatment in accordance with our invention will vary depending upon the kind and amount of solids present. The following, however, is a preferred example of treatment of municipal sewage containing about 200 to 300 parts per million of suspended solids. This sewage is treated in the primary clarifier 13 of Fig. 1. It is continuously introduced through the central well 12 of this clarifier against a head of about 15 feet. The entering sewage is charged with gas introduced in a charged water stream which enters the incoming stream of sewage through the pipe 11. For each gallon of sewage introduced, from $\frac{1}{10}$ to $\frac{2}{10}$ gallons of charged water is used. The charged water contains dissolved air sufficient to supercharge the entire inflowing stream with from 2 to 3 times the amount of air which the sewage will contain in solution under atmosphere conditions of temperature and pressure, i. e. 1.87% by volume. In other words, the charged stream of sewage mixed with the water contains from 4% to 6% of air by volume.

The residence time in the primary clarifier is from 5 to 30 minutes depending upon the characteristics of the sewage. During this time about 35% of the total suspended solids is floated out and about 10% settles and is removed from the bottom of the clarifier as sludge. The balance of the solids is carried off in the effluent to the secondary clarifier, where the great bulk of its is settled. In short, the solids removal in the clarifier of the invention in which flotation occurs is from 45% to 55% as opposed to a solids removal of only 10% to 20% in a conventional clarifier of the same size operating with like material and at like throughput, but not employing flotation and depending upon settlement alone for solids removal. The B. O. D. reduction under the conditions of operation recited above is 25% to 30%, as compared with 10% to 20% obtained in a conventional clarifier of like size operating with the same feed and the same throughput, but without the introduction of dissolved air.

We claim:

1. In clarifying sewage, the improvement which comprises simultaneously settling and floating solids out of a pool of the sewage having an unconfined upper surface by introducing into a confined stream of the sewage under a hydraulic head a smaller stream of water charged with gas containing oxygen, and introducing the resulting mixture into the pool on which the hydraulic head is less so that the gas escapes as fine bubbles in the pool and buoys up some solids to the top of the pool while other solids sink in the pool, and removing the buoyed-up solids from the top of the pool.

2. In clarifying sewage, the improvement which comprises simultaneously settling and floating solids out of a pool of the sewage having an unconfined upper surface by introducing into a confined stream of the sewage under a hydraulic head another stream of water charged with gas containing oxygen and introducing the resulting mixture into the pool where the hydraulic head is less so that the gas forms fine bubbles in the pool and buoys up some solids to the top of the pool while other solids sink in the pool, removing the buoyed-up solids from the top of the pool and removing settled solids from the bottom of the pool.

3. In clarifying sewage involving the removal of a clarified liquid effluent therefrom, the improvement which comprises simultaneously settling and floating solids out of a pool of the sewage having an unconfined upper surface by charging at least a portion of the removed clarified effluent with air, introducing into a confined stream of the sewage under a hydraulic head a smaller stream of the air-charged clarified effluent, and introducing the resulting mixture into the pool where the hydraulic head is less so that the gas forms fine bubbles in the pool and buoys up some solids to the top of the pool while other solids sink in the pool, removing the buoyed-up solids from the top of the pool and removing settled solids from the bottom of the pool.

4. Process according to claim 3 in which the clarified effluent is subjected to aeration and further clarification with removal of additional solids therefrom, thereafter a portion of the further clarified effluent being air-charged and introduced to the sewage stream.

5. Process according to claim 3 in which the clarified effluent is subjected to aeration and further clarification, with removal of additional solids therefrom as sludge, at least a portion of the sludge being introduced into the stream of sewage sent to the pool with the air-charged clarified effluent.

6. In clarifying sewage, the improvement which comprises simultaneously settling and floating solids out of a pool of the sewage having an unconfined upper surface by introducing into a confined stream of the sewage under a hydraulic head a smaller stream of air-charged water, and introducing the resulting mixture into a central portion of the pool where the hydraulic head is less so that the air escapes as fine bubbles in the pool and buoys up some solids to the top of the pool while other solids sink in the pool, removing the buoyed-up solids from the pool, removing the buoyed-up solids from the central portion of the top of the pool, removing settled solids from the bottom of the pool, and removing clarified effluent around the upper edge of the pool.

7. In apparatus for sewage treatment including a tank for holding a pool of the sewage open to the atmosphere, means for removing sludge settling out of the sewage on the tank bottom, a baffle in the tank spaced from the bottom thereof and projecting below and above the surface of the pool and dividing it into two compartments, and means for removing clarified effluent from the upper portion of the pool in one compartment, the combination which comprises means for charging a water stream with dissolved gas containing oxygen, means for introducing a stream of the charged water into a confined stream of incoming sewage under a higher head than that existing in the pool, means for introducing the resulting mixed stream containing the dissolved gas into the pool within the other compartment, and means for removing from the surface of the pool within said other compartment solids buoyed-up by the gas given up by the contents of the pool.

8. In apparatus for sewage treatment including a tank for holding a pool of the sewage open to the atmosphere, means for removing sludge settling out of the sewage on the tank bottom, an annular baffle in the tank spaced from the sides and bottom thereof and projecting below and above the surface of the pool, and means for removing clarified effluent from the upper portion of the pool outside the baffle, the combination which comprises means for charging a water stream with dissolved gas containing air, means for introducing the charged water stream under a hydraulic head into a stream of the sewage to be treated, means for introducing a stream of the resulting mixture into the pool at a lower hydraulic head within the baffle, and means for removing from the surface of the pool solids buoyed-up therein by the gas given up by the charged mixture.

References Cited in the file of this patent

UNITED STATES PATENTS

| Number | Name | Date |
|---|---|---|
| Re. 22,701 | Kelly et al. | Dec. 4, 1945 |
| 864,856 | Norris | Sept. 3, 1907 |
| 1,069,169 | Parker | Aug. 5, 1913 |
| 2,246,224 | Streander | June 17, 1941 |
| 2,479,403 | Powers | Aug. 16, 1949 |
| 2,492,486 | Kivari et al. | Dec. 27, 1949 |

FOREIGN PATENTS

| Number | Country | Date |
|---|---|---|
| 14,733 | Great Britain | of 1915 |

OTHER REFERENCES

"Sewerage and Sewage Treatment," by Babbitt, 6th ed. (1947), page 454.